United States Patent
Jung et al.

(10) Patent No.: US 10,683,391 B2
(45) Date of Patent: Jun. 16, 2020

(54) THERMOPLASTIC ELASTOMER RESIN COMPOSITION FOR MOISTURE-PERMEABLE WATERPROOF FILM, FILM AND FABRIC USING SAME

(71) Applicants: KOLON INDUSTRIES, INC., Gwacheon-si, Gyeonggi-do (KR); KOLON PLASTICS, INC., Gimcheon-si, Gyeongsangbuk-do (KR); KOLON FASHION MATERIAL, INC., Gwacheon-si Gyeonggi-do (KR)

(72) Inventors: Yu In Jung, Yongin-si (KR); Yu Hyun Kim, Yongin-si (KR); Ji Yong Park, Yongin-si (KR); Sung Keun Park, Yongin-si (KR); Gun Min Lee, Yongin-si (KR); Sang Hyun Moon, Yongin-si (KR)

(73) Assignees: KOLON INDUSTRIES, INC., Gwacheon-si, Gyeonggi-Do (KR); KOLON PLASTICS, INC., Gimcheon-si, Gyeongsangbuk-Do (KR); KOLON FASHION MATERIAL, INC., Gwacheon-si, Gyeonggi-Do (KR)

( * ) Notice: Subject to any disclaimer, the term of this patent is extended or adjusted under 35 U.S.C. 154(b) by 198 days.

(21) Appl. No.: 15/541,265

(22) PCT Filed: Dec. 31, 2015

(86) PCT No.: PCT/KR2015/014560
§ 371 (c)(1),
(2) Date: Jun. 30, 2017

(87) PCT Pub. No.: WO2016/108663
PCT Pub. Date: Jul. 7, 2016

(65) Prior Publication Data
US 2017/0355812 A1  Dec. 14, 2017

(30) Foreign Application Priority Data
Dec. 31, 2014  (KR) .................. 10-2014-0196059

(51) Int. Cl.
C08G 63/183 (2006.01)
C08G 63/672 (2006.01)
C08G 65/34 (2006.01)
C08J 5/22 (2006.01)
B32B 27/28 (2006.01)
B32B 27/36 (2006.01)

(52) U.S. Cl.
CPC ......... *C08G 63/183* (2013.01); *C08G 63/672* (2013.01); *C08G 65/34* (2013.01); *C08J 5/2256* (2013.01); *B32B 27/285* (2013.01); *B32B 27/36* (2013.01); *B32B 2307/724* (2013.01)

(58) Field of Classification Search
CPC . B32B 2307/724; B32B 27/285; B32B 27/36; C08G 63/183; C08G 63/672; C08G 65/34; C08G 5/2256
See application file for complete search history.

(56) References Cited

U.S. PATENT DOCUMENTS

2009/0117362 A1 * 5/2009 Schosseler ............ B29C 55/143
428/220
2013/0156994 A1   6/2013 Hsu et al.
2013/0197143 A1 * 8/2013 Sun ........................ C08G 65/20
524/377

FOREIGN PATENT DOCUMENTS

| JP | H03-213581 A | | 9/1991 |
|---|---|---|---|
| JP | H04-249142 A | | 4/1992 |
| JP | H04-146275 A | | 5/1992 |
| JP | H05-78984 A | | 3/1993 |
| JP | H05-124144 A | | 5/1993 |
| JP | H07-258971 A | | 10/1995 |
| JP | H08-13352 A | | 1/1996 |
| JP | 11-035666 A | | 2/1999 |
| JP | 11-043590 | * | 2/1999 |
| JP | 11-043590 A | | 2/1999 |
| JP | 11-080389 A | | 3/1999 |
| JP | 2004-195833 A | | 7/2004 |
| KR | 10-2013-0078772 A | | 7/2013 |

OTHER PUBLICATIONS

S. J. Metz et al "Gas-Permeation Properties of Poly(ethylene oxide) Poly(butylene terephthalate) Block Copolymers",Macromolecules 2004, 37, 4590-4597 (Year: 2004).*

* cited by examiner

*Primary Examiner* — Ling Siu Choi
*Assistant Examiner* — Gennadiy Mesh
(74) *Attorney, Agent, or Firm* — Novick, Kim & Lee, PLLC; Jae Youn Kim

(57) ABSTRACT

A thermoplastic elastomer resin composition for a moisture-permeable waterproof film includes a thermoplastic elastomer resin composed of a hard segment containing polybutylene terephthalate and a soft segment containing polyethylene glycol and polytetramethylene glycol, wherein the polyethylene glycol is contained in an amount of 30 to 70 wt % and the polytetramethylene glycol is contained in an amount of 1 to 10 wt %, based on the total weight of the thermoplastic elastomer resin. A moisture-permeable waterproof film formed of the elastomer composition and a moisture-permeable waterproof fabric in which the moisture-permeable waterproof film is stacked on at least one surface of a substrate fiber are also provided.

7 Claims, No Drawings

THERMOPLASTIC ELASTOMER RESIN COMPOSITION FOR MOISTURE-PERMEABLE WATERPROOF FILM, FILM AND FABRIC USING SAME

TECHNICAL FIELD

The present invention relates to a thermoplastic elastomer resin composition, which exhibits moisture-permeable waterproof performance, and to a film and fabric using the same.

BACKGROUND ART

A moisture-permeable waterproof material is a highly functional material in which two contradictory properties, namely moisture permeability for allowing air or water vapor to pass and waterproofness for preventing the penetration of liquid such as raindrops, are balanced well, and has become popular due to application not only to ski wear or rainwear but also to many types of sportswear for climbing, golf, marine sports, etc. Techniques for realizing such a moisture-permeable waterproof material have been steadily developed since the 1960s and then accelerated owing to the development of Gore-Tex in the mid and late 1970s, and various developments are still being made to improve the performance thereof.

A moisture-permeable waterproof material may be classified according to the processing method thereof into a coated type in which a film is formed and a laminated type in which a thin film is bonded, and the coated type may be divided into (i) a wet-coated type in which a polyurethane coating layer having fine pores is formed on a fabric in water and (ii) a dry-coated type in which a uniform polyurethane film layer is formed on a fabric by applying a resin composition including an organic solvent having high volatility to a predetermined thickness on the fabric and then performing thermal treatment to volatilize the organic solvent. Furthermore, depending on the principle whereby the moisture-permeable waterproof function is exhibited, it may be classified into a microporous type comprising fine pores, a nonporous hydrophilic type, a nanoweb type, and a shape-memory type.

With regard to the moisture-permeable waterproof material, patent techniques using a laminating process include Japanese Patent Application Publication No. Hei. 5-124144, which discloses a moisture-permeable waterproof sheet manufactured by laminating a polyethylene porous film and a nonwoven fabric comprising a heat-bondable fiber using heat and pressure, and Japanese Patent Application Publication No. Hei. 3-213581, which discloses a moisture-permeable waterproof fabric having high wear resistance obtained by laminating, on a fabric, a moisture-permeable film comprising poly-amino-acid-based polyurethane containing 0.1% or more of a powder composed of L-lysine and an organic acid, and additionally, a variety of dry/wet coating processes are disclosed in Japanese Patent Application Publication Nos. Hei. 4-249142, 4-146275, 7-258971, 5-78984, and 8-13352.

The manufacturing methods disclosed in the above conventional techniques are very complicated, and the resulting moisture-permeable waterproof film or membrane has non-uniform pores, making it impossible to solve the problem of low moisture permeability. Furthermore, in the case where the organic solvent is used during the manufacturing process, the dye of the fabric is released due to the organic solvent, undesirably causing contamination.

Meanwhile, polytetrafluoroethylene (PTFE), which is commonly known to be a material for Gore-Tex, has high moisture permeability, chemical resistance and lightfastness because of the uniform formation of fine pores in the film, and is thus very favorably used despite the high price thereof. However, PTFE is poor in mechanical fatigue strength and washing durability and involves the risk of releasing environmentally harmful materials such as PFCs (perfluorinated and polyfluorinated compounds), FTOHs (fluorotelomer alcohols), PFCAs (perfluorinated carboxylic acids), PFOS (perfluorinated sulfonate), PFOA (perfluorooctanoic acid), etc.

Although polyurethane, which has high moisture permeability and may be subjected to various processing methods, has been mainly used to date as the moisture-permeable waterproof material, polyurethane suffers from poor washing durability when applied to clothes, thereby decreasing hydrostatic pressure. In particular, when the pore size of the film is increased in order to ensure air permeability as high as that of PTFE, the mechanical strength of the material may be drastically decreased. Moreover, in the case where polyurethane is directly applied on a fabric through a wet or dry process, the resin solution may penetrate into the fabric, and thus the tactile sensation of products may become hard, and furthermore, limitations are imposed on exhibiting functionality such as moisture permeability, water resistance, etc.

DISCLOSURE

Technical Problem

Accordingly, the present invention is intended to provide a moisture-permeable waterproof film and fabric and a thermoplastic elastomer resin composition for preparing the same, wherein a polyester elastomer-based moisture-permeable waterproof material is used, thereby exhibiting high moisture permeability and waterproofness, superior tactile sensation and durability, an outstanding outer appearance and environmentally friendly properties.

Technical Solution

A preferred first embodiment of the present invention provides a thermoplastic elastomer resin composition for a moisture-permeable waterproof film, comprising: a thermoplastic elastomer resin comprising a hard segment containing a polybutylene terephthalate component and a soft segment containing a polyethylene glycol component and a polytetramethylene glycol component, wherein the polyethylene glycol (PEG) component of the soft segment is contained in an amount of 30 to 70 wt % and the polytetramethylene glycol (PTMG) component of the soft segment is contained in an amount of 1 to 10 wt %, based on the total weight of the thermoplastic elastomer resin.

The thermoplastic elastomer resin composition according to the first embodiment may further comprise 0.01 to 30 parts by weight of an anti-blocking agent based on 100 parts by weight of the thermoplastic elastomer resin.

In the first embodiment, the anti-blocking agent may be at least one selected from the group consisting of silicon, silica, calcium carbonate, talc, montmorillonite, mica, wollastonite, barium sulfate, titanium dioxide, zeolite, and Teflon.

The thermoplastic elastomer resin composition according to the first embodiment may further comprise 0.5 to 15 parts by weight of an additive based on 100 parts by weight of the thermoplastic elastomer resin.

In the first embodiment, the additive may be at least one selected from the group consisting of a heat-resistant agent and an anti-weathering agent including a hindered amine-based light stabilizer and a UV absorbent.

Also, a preferred second embodiment of the present invention provides a moisture-permeable waterproof film, formed using a thermoplastic elastomer resin composition comprising a thermoplastic elastomer resin and 0.01 to 30 parts by weight of an anti-blocking agent based on 100 parts by weight of the thermoplastic elastomer resin, wherein the thermoplastic elastomer resin comprises a hard segment containing a polybutylene terephthalate component and a soft segment containing a polyethylene glycol component and a polytetramethylene glycol component, the polyethylene glycol component of the soft segment is contained in an amount of 30 to 70 wt %, and the polytetramethylene glycol component of the soft segment is contained in an amount of 1 to 10 wt %, based on the total weight of the thermoplastic elastomer resin.

In the second embodiment, the anti-blocking agent may be at least one selected from the group consisting of silicon, silica, calcium carbonate, talc, montmorillonite, mica, wollastonite, barium sulfate, titanium dioxide, zeolite, and Teflon.

In the second embodiment, the thermoplastic elastomer resin composition may further comprise 0.5 to 15 parts by weight of an additive based on 100 parts by weight of the thermoplastic elastomer resin, and the additive may be at least one selected from the group consisting of a heat-resistant agent and an anti-weathering agent including a hindered amine-based light stabilizer and a UV absorbent.

The moisture-permeable waterproof film according to the second embodiment may have a moisture permeability of 10,000 to 150,000 (g/m$^2$*day) in accordance with JIS L 1099(B-1) and a hydrostatic pressure of 5,000 to 30,000 (mmH$_2$O) in accordance with KSK ISO 811-2009.

The moisture-permeable waterproof film according to the second embodiment may have a haze of 30 to 90% in accordance with ASTM D1003, and the film thickness is preferably 1.0 to 100 μm.

Also, a preferred third embodiment of the present invention provides a moisture-permeable waterproof fabric comprising a substrate fiber and the moisture-permeable waterproof film according to the second embodiment, stacked on at least one surface of the substrate fiber.

In the third embodiment, the substrate fiber may be any one of a woven fabric, a knitted fabric and a nonwoven fabric formed of at least one yarn selected from the group consisting of polypropylene, polyethylene, polyester, nylon, aramid, rayon, acryl, spandex, lyocell, cotton, wool and silk.

In the third embodiment, the stacking process may be performed through thermal fusion or using an adhesive. The stacking process using an adhesive may be laminating or hot melting using at least one adhesive selected from the group consisting of a polyurethane-based wet curable adhesive, a two-component polyurethane-based adhesive, a thermosetting hot-melt polyurethane adhesive, an ethylene vinyl acetate-based adhesive, a polyester-based hot-melt adhesive, an acrylic adhesive, and an EVA adhesive.

The moisture-permeable waterproof fabric according to the third embodiment may further comprise at least one processed layer selected from among a water-repellent coating layer and a resin pattern layer on at least one surface of the fabric.

Advantageous Effects

According to the present invention, an elastomer composition and a moisture-permeable waterproof film can exhibit superior moisture permeability and waterproofness, and a fabric manufactured using the same can manifest high washing and adhesion durability, an excellent tactile sensation of garments and a good outer appearance, and does not release environmentally burdensome materials and is thus environmentally friendly.

BEST MODE

A first embodiment of the present invention may address a thermoplastic elastomer resin composition for a moisture-permeable waterproof film, comprising a thermoplastic elastomer resin comprising a hard segment containing a polybutylene terephthalate component and a soft segment containing a polyethylene glycol component and a polytetramethylene glycol component, wherein the polyethylene glycol component of the soft segment is contained in an amount of 30 to 70 wt % and the polytetramethylene glycol component of the soft segment is contained in an amount of 1 to 10 wt %, based on the total weight of the thermoplastic elastomer resin.

In addition, a second embodiment of the present invention may address a moisture-permeable waterproof film, formed using a thermoplastic elastomer resin composition comprising a thermoplastic elastomer resin and 0.01 to 30 parts by weight of an anti-blocking agent based on 100 parts by weight of the thermoplastic elastomer resin, wherein the thermoplastic elastomer resin comprises a hard segment containing a polybutylene terephthalate component and a soft segment containing a polyethylene glycol component and a polytetramethylene glycol component, and the polyethylene glycol component is contained in an amount of 30 to 70 wt % and the polytetramethylene glycol component is contained in an amount of 1 to 10 wt %, based on the total weight of the thermoplastic elastomer resin.

In addition, a third embodiment of the present invention may address a moisture-permeable waterproof fabric, configured such that the moisture-permeable waterproof film according to the second embodiment is stacked on at least one surface of a substrate fiber.

According to the present invention, the moisture-permeable waterproof film and fabric may be applied to, for example, an air filter or a building material, as well as a moisture-permeable waterproof film interposed between inner garments and outer garments for moisture-permeable waterproof clothes such as sportswear, rain coats, shoes, fire-fighting uniforms, military uniforms, etc.

Hereinafter, a detailed description will be given of a thermoplastic elastomer resin composition and a moisture-permeable waterproof film and fabric according to the present invention.

Elastomer Composition for Moisture-Permeable Waterproof Film

According to a preferred aspect of the present invention, the moisture-permeable waterproof film may be formed from a thermoplastic elastomer resin composition including a thermoplastic elastomer resin configured such that, based on the total weight of the thermoplastic elastomer resin, a soft segment containing 30 to 70 wt % of a polyethylene glycol component and 0.1 to 10 wt % of a polytetramethylene glycol component and a hard segment containing the remainder of a polybutylene terephthalate component are melt-kneaded or copolymerized.

The thermoplastic elastomer resin of the present invention may include a hard segment containing a polybutylene terephthalate component and a soft segment containing a polyethylene glycol component and a polytetramethylene glycol component.

Here, the thermoplastic elastomer resin preferably includes a thermoplastic elastomer resin (A), obtained by copolymerizing a polybutylene terephthalate (PBT) component and a polyethylene glycol component, and a thermoplastic elastomer resin (B) obtained by copolymerizing a polybutylene terephthalate (PBT) component and a polytetramethylene glycol component, the thermoplastic elastomer resin (A) having a Shore D hardness of 25 to 72 and an intrinsic viscosity (IV) of 1.50 to 4.00, and the thermoplastic elastomer resin (B) having a Shore D hardness of 25 to 72 and an intrinsic viscosity (IV) of 1.50 to 4.00. Specifically, the thermoplastic elastomer resin of the present invention is imparted with a hardness of 25D or more by appropriately increasing the amount of the soft segment, whereby the thermoplastic elastomer resin has an appropriate melting point, thus improving processability upon the formation of a film. Also, a hardness of 72D or less may be achieved by appropriately decreasing the amount of the soft segment, thus exhibiting desired moisture permeability. Furthermore, the thermoplastic elastomer resin of the present invention has an intrinsic viscosity of 1.5 to 4.0, whereby the melt flowability of the thermoplastic elastomer resin may be properly set, thus improving processability upon the formation of a film.

In the present invention, the soft segment may be composed of two or more components, and may include hydrophilic polyol and hydrophobic polyol. The hydrophilic polyol may be a polyethylene glycol component having a number average molecular weight of 600 to 8,000 as measured by GPC (Gel Permeation Chromatography) in order to ensure mechanical properties and facilitate the preparation of an elastomer, and the amount thereof is preferably 30 to 70 wt % based on the total weight of the thermoplastic elastomer resin. If the amount of hydrophilic polyol is less than 30 wt %, it is difficult to exhibit desired moisture permeability. On the other hand, if the amount thereof exceeds 70 wt %, the melting point may decrease and thus melt flowability may become unstable at the same processing temperature, and poor processability may also result. Furthermore, the film may undergo excessive swelling upon contact with water, undesirably incurring a poor outer appearance.

Also, the hydrophobic polyol component may include a polytetramethylene glycol component having a number average molecular weight of 600 to 8,000 as measured by GPC (Gel Permeation Chromatography), and the polytetramethylene glycol component is preferably contained in an amount of 0.1 to 10 wt % based on the total weight of the thermoplastic elastomer resin, taking into consideration the flexibility of a film, a modulus difference thereof from the substrate fiber, and swelling of the film due to water.

Meanwhile, according to a preferred aspect of the present invention, the thermoplastic elastomer resin composition may include an anti-blocking agent in order to improve the workability and anti-blocking performance of a film. In the present invention, the anti-blocking agent may include at least one selected from the group consisting of silicon, silica, calcium carbonate, talc, montmorillonite, mica, wollastonite, barium sulfate, titanium dioxide, zeolite, and Teflon. In the present invention, the amount of the anti-blocking agent is preferably 0.01 to 30 parts by weight based on 100 parts by weight of the thermoplastic elastomer resin. If the amount thereof is less than 0.01 parts by weight, anti-blocking performance may not be exhibited, thus causing defects such as incomplete winding or adhesion of the film upon the formation and winding of the film. On the other hand, if the amount thereof exceeds 30 parts by weight, the hardness and specific gravity of the film may be excessively increased.

In the present invention, the anti-blocking agent more preferably includes barium sulfate having a particle size of 0.1 to 7 μm, and the amount of barium sulfate is preferably 0.1 to 30 parts by weight based on 100 parts by weight of the thermoplastic elastomer resin, but the present invention is not limited thereto.

The anti-blocking agent may be used together with an amine-based lubricant, such as stearamide, stearyl erucamide, ethylene bis-oleamide, ethylene bis-stearamide, erucamide, oleamide, and oleyl palmitamide, a mineral lubricant such as montan wax, and a polyolefin-based wax such as paraffin wax or polyethylene (PE) wax, in order to further improve the performance thereof, but the present invention is not necessarily limited thereto.

In a preferred aspect of the present invention, the thermoplastic elastomer resin composition may further include 0.5 to 15 parts by weight of an additive based on 100 parts by weight of the thermoplastic elastomer resin. The additive may include at least one selected from the group consisting of a heat-resistant agent and an anti-weathering agent including a hindered amine-based light stabilizer and a UV absorbent. If the amount of the additive is less than 0.5 parts by weight, UV decomposition cannot be sufficiently prevented. On the other hand, if the amount thereof exceeds 15 parts by weight, it is difficult to form the film and excess volatile organic compounds (VOCs) may be generated, which is undesirable.

In the present invention, the heat-resistant agent functions as an antioxidant for exhibiting thermal stability, and may include a hindered phenol-based heat-resistant agent, such as pentaerythritol tetrakis-(methylene)-(3,5-di-tert-buthyl)-4-hydroxyphenyl propionate. The amount of the heat-resistant agent is, without being limited to, 0.05 to 0.5 wt % based on the total weight of the thermoplastic elastomer resin composition.

In the present invention, the anti-weathering agent may include at least one selected from among a hindered amine-based light stabilizer and a UV absorbent. Particularly, in order to impart superior weatherability, a combination of a UV absorbent and a hindered amine-based light stabilizer is preferably used. The hindered amine-based light stabilizer may function as a radical scavenger that neutralizes radicals generated upon UV irradiation, and the UV absorbent may be exemplified by benzotriazole or benzophenone, and plays a role in absorbing the UV radiation into the molecule thereof to thus be converted into weak thermal energy so as to reduce the effect of the UV radiation on the thermoplastic elastomer composition.

The hindered amine-based light stabilizer may include, for example, a polycondensate compound of dibutylamine-1,3,5-triazine-N,N-bis(2,2,6,6-tetramethyl-4-piperidyl)-1,6-hexamethylenediamine and N-(2,2,6,6-tetramethyl)-4-piperidylbutylamine.

When the hindered amine-based light stabilizer is added, the amount thereof may be set to the range of 0.1 to 2 wt % based on the total weight of the elastomer composition. If the amount of the hindered amine-based light stabilizer is less than 0.1 wt %, sufficient weatherability cannot be exhibited. On the other hand, if the amount thereof exceeds 2 wt %, it is difficult to form a film having a uniform thickness during the film formation process, and excessive gas generation may result. Particularly, in order to improve the durability of the thermoplastic elastomer composition, any one or a mixture of two or more selected from the group consisting of 2,2'-m-phenylene bis(2-oxazoline), 4,4'-bis(α, α-dimethylbenzyl-diphenylamine), and N,N'-hexane-1,6-diyl bis(3-(3,5-di-tert-butyl-4-hydroxyphenyl propionamide)) is preferably useful.

Examples of the UV absorbent may include 2-(2H-benzotriazol-2-yl)-4-6-bis(1-methyl-1-phenylethyl)phenol, 2-(5-chloro-(2H)-benzotriazol-2-yl)-4-methyl-6-(tert-butyl) phenol, 2-(4,6-diphenyl-1,3,5-triazin-2-yl)-5-(hexyloxy)-phenol, and 2,4-di-tert-butyl phenyl-3,5-di-tert-butyl-4-hydroxy benzoate. When the UV absorbent is added, the amount thereof may be 0.1 to 2 wt % based on the total weight of the thermoplastic elastomer resin composition. If the amount thereof is less than 0.1 wt %, sufficient weatherability cannot be exhibited. On the other hand, if the amount thereof exceeds 2 wt %, it is difficult to form a film having a uniform thickness during the film formation process, and excessive gas generation may result.

Moisture-Permeable Waterproof Film

In the present invention, a method of manufacturing a moisture-permeable waterproof film using the thermoplastic elastomer resin composition including the thermoplastic elastomer resin may include, for example, a known process such as an inflation process or a die extrusion process, and the thickness of the film may be controlled depending on the end use thereof, and preferably falls in the range of 1 to 100 μm. Here, in the case of requiring very high moisture permeability, the film is more preferably manufactured so as to have a thickness of 5 to 50 μm. If the thickness of the film is less than 1 μm, the film is too thin, and thus the durability, heat resistance, hydrostatic pressure and mechanical strength thereof may deteriorate. On the other hand, if the thickness thereof exceeds 100 μm, the overall thickness of the product may increase and moisture permeability may decrease, or the bending hardness of the film may increase, making it difficult to bond and handle the film, and thus the scope of application thereof may be limited.

The moisture-permeable waterproof film thus manufactured may have a haze of 30% to 90% in accordance with ASTM D1003, taking into consideration the outer appearance of the final fabric. The haze may be adjusted depending on the amount of anti-blocking agent that is added. However, if the haze thereof is less than 30%, it is difficult to realize a high-quality outer appearance. On the other hand, if the haze thereof exceeds 90%, the moisture-permeable waterproof film may be white-colored or light-colored, and thus, upon the production of a moisture-permeable waterproof fabric, the surface thereof may become non-uniform due to the aggregated particles in the film, or the dye of the fabric may be sublimated toward the surface of the film, whereby the film become non-uniform or stained, undesirably damaging the outer appearance thereof.

The moisture-permeable waterproof film of the present invention is composed of segmented copolyether ester configured such that a hard segment (a polyester block) as a crystalline block is dispersed in a soft segment (a polyether matrix) as a flexible non-crystalline block having a low glass transition temperature, whereby hydrophilic/hydrophobic intermolecular attractions interact between the hydrophilic polymer and the hydrophobic polymer. Specifically, the hydrophobic region allows water (e.g.: sweat emitted from the skin) to be expelled to the outside, and the hydrophilic region allows water or water vapor to be attracted thereto. Furthermore, hydrophobic polyol contained in the soft segment functions to reduce the swelling of the moisture-permeable waterproof film.

The water emitted from the skin or the outside by means of osmotic pressure and intermolecular attraction (van der Waals force) is rapidly absorbed to the hydrophilic non-crystalline block through the crystalline hydrophobic layer. Thus, the moisture-permeable waterproof film of the present invention may exhibit a moisture permeability of 3,000 to 100,000 (g/m$^2$*day) in accordance with JIS L 1099(B-1) and a hydrostatic pressure of 3,000 to 30,000 (mmH$_2$O) in accordance with ISO 811.

Also, when the moisture-permeable waterproof film is stacked on a fiber, the absorbed water may continuously be moved due to the pores of the fabric and the hydrophobicity thereof to thus be rapidly discharged to the air, thereby achieving quick drying. Furthermore, when an adhesive is additionally stacked, water is more rapidly moved to the fabric layer due to the action of osmotic pressure by the hydrophilic adhesive, and is then discharged. Here, the moisture-permeable waterproof fabric of the present invention may be variably increased in moisture permeability with an increase in temperature because hydrophilic molecular chains sensitively undergo micro Brownian motion in response to the external temperature.

PTFE, commonly known as Gore-Tex, has pores therein and thus exhibits good moisture permeability, but the pores thereof may be damaged upon washing, thus decreasing moisture permeability and causing secondary contamination attributable to the presence of impurities. However, the moisture-permeable waterproof film of the present invention, having no pores, may manifest superior washing durability.

Moisture-Permeable Waterproof Fabric

Another aspect of the present invention addresses a moisture-permeable waterproof fabric, comprising a substrate fiber and the aforementioned moisture-permeable waterproof film stacked on at least one surface of the substrate fiber, the substrate fiber being any one of a woven fabric, a knitted fabric and a nonwoven fabric, formed of at least one yarn selected from the group consisting of polypropylene, polyethylene, polyester, nylon, aramid, rayon, acryl, spandex, lyocell, cotton, wool and silk.

Here, the stacking of the substrate fiber and the moisture-permeable waterproof film may be performed through thermal fusion or using an adhesive. The stacking process using an adhesive may be laminating or hot melting using at least one adhesive selected from the group consisting of a polyurethane-based wet curable adhesive, a two-component polyurethane-based adhesive, a thermosetting hot-melt polyurethane adhesive, an ethylene vinyl acetate-based adhesive, a polyester-based hot-melt adhesive, an acrylic adhesive, and an EVA adhesive.

The stacking process through thermal fusion may be a T-die direct coating process in which a film is directly bonded to a substrate fiber while being manufactured. In this way, a film having a uniform thickness of 5 to 100 μm is formed through a die attached to the front of an extruder, the temperature of which may be adjusted in the range of 150 to 300° C., and the substrate fiber is fed immediately before the gel film comes into contact with a cooling roll, whereby the film is attached to one surface of the substrate fiber and then stacked while being solidified through the cooling roll. The thermal fusion process does not need an additional bonding or stacking process, thus improving production efficiency and preventing moisture permeability from decreasing due to the adhesive.

On the other hand, when a moisture-permeable waterproof fabric having a good tactile sensation and satisfactory drape performance is to be manufactured, the stacking process through laminating or hot melting may be more easily applied. Among the aforementioned adhesives, a hydrophilic two-component polyurethane-based adhesive is more preferably used upon the laminating process, and a polyurethane wet curable adhesive may be used upon the hot melting process. In particular, the adhesive suitable for hot melting is solid or viscous at room temperature, like the non-solvent type, but is melted when heated and is thus suitable for a coating process, and may also exhibit cohesive force through cooling, and is thus useful in dot coating.

With regard to the stacking process through hot melting, hot melting is performed in a manner in which a hot-melt adhesive sheet configured to contain an adhesive component is heated while being transferred together between a substrate fiber and a film, whereby the hot-melt adhesive sheet is melt-stacked on the substrate fiber and the film is stacked through compression of a press roller. Here, the hot-melt adhesive sheet may be an adhesive film or an adhesive web. The stacking process using the hot-melt adhesive sheet is conducted using a heating roller at 100 to 150° C. The melting of the adhesive sheet is not efficient at temperatures lower than 100° C., making it impossible to obtain desired adhesive strength, whereas the substrate fiber and the film may be damaged at temperatures higher than 150° C., making it difficult to attain a product.

In the present invention, the adhesive may be added with an additive such as a tackifier, a curing catalyst, a plasticizer, a stabilizer, a filler, a dye, a pigment, a fluorescent brightener, a silane coupling agent, a wax, an anti-blocking agent, a thermoplastic resin, etc., as necessary, within a range that does not retard the purpose of the present invention. Examples of the tackifier may include, but are not limited to, a rosin-based resin, a rosin ester-based resin, a hydrogenated rosin ester-based resin, a terpene-based resin, a terpene phenolic resin, a hydrogenated terpene-based resin, and a petroleum resin, such as a C5-based aliphatic resin, a C9-based aromatic resin, and a copolymer of C5 and C9.

The adhesive may be applied through full coating, but is preferably applied through intermittent coating in order to maintain good moisture permeability or flexibility of the substrate fiber. The intermittent coating process may include a dot-coating process or a mesh-coating process, and a dot-coating process is particularly useful, but the present invention is not necessarily limited thereto. The adhesive may be applied through gravure transfer coating using a carved roll, screen coating, T-die coating, or fiber coating. Here, the heating melting temperature of the adhesive preferably falls in the range of 80 to 130° C., and more preferably 80 to 120° C.

The amount of the adhesive that is transferred onto the substrate fiber is preferably 5 to 50 g/m$^2$. If the amount thereof is too large, the texture of the fabric may be excessively hardened, undesirably deteriorating tactile sensation. On the other hand, if the amount thereof is too small, bonding strength is insufficient, making it impossible to obtain sufficient durability to perform a washing process, ultimately deteriorating adhesion between the film and the fiber. Furthermore, in order to transfer and apply the molten adhesive on the fabric, both a transport device and a coating device have to be heated and completely hermetically sealed so as not to be exposed to the air during the process.

Before complete curing of the adhesive transferred onto the substrate fiber, the substrate fiber and the moisture-permeable waterproof film are preferably laminated using a laminating roll to give a fabric. During the laminating process, preheating is preferably performed using an IR heater. After the lamination of the fiber and the film, the adhesive may react with a small amount of water contained in the film and air while being cooled, and is thus converted into a three-dimensional cross-linked thermosetting material, thereby exhibiting adhesion that results in high toughness and durability.

In a preferred aspect of the present invention, the moisture-permeable waterproof fabric may further include at least one processed layer selected from among a water-repellent coating layer and a resin pattern layer on at least one surface of the fabric. The water-repellent coating layer or the resin pattern layer may be stacked, regardless of the sequence thereof, and may also be formed on either the inner surface or the outer surface of the fabric.

In the present invention, a water-repellent agent suitable for water-repellent coating may include a fluorine-based water-repellent agent, a silicone-based water-repellent agent, an acrylic water-repellent agent, a polyethylene-based water-repellent agent, a polypropylene-based water-repellent agent, a polyamide-based water-repellent agent, and a polyester-based water-repellent agent. Preferably useful is a fluorine-based water-repellent agent, a silicone-based water-repellent agent or an acrylic water-repellent agent within a range that exhibits high processability and does not retard the tactile sensation of the fabric. The add-on ratio of the water-repellent coating layer preferably falls in the range of 0.01 to 8.0 wt %, which corresponds to a weight gain after drying relative to the weight of the substrate fiber. If the add-on ratio thereof is less than 0.01 wt %, sufficient water-repellent performance cannot be obtained. On the other hand, if the add-on ratio thereof exceeds 8.0 wt %, a soft touch sense may decrease.

The water-repellent composition is preferably mixed with a binder in order to increase processability. The binder may include any one or a mixture of two or more selected from among an acrylic binder, a polyester-based binder, and a polyurethane-based binder. The water-repellent coating may be performed by uniformly applying the corresponding solution on the surface of the substrate fiber through spraying, impregnation, printing, rolling, or solution casting, and then fixing it to the surface of the substrate fiber through thermal treatment.

In the present invention, the resin pattern layer mainly functions to protect the substrate fiber or the moisture-permeable waterproof film, but may effectively prevent the fiber or film from sticking to the skin by forming surface roughness of the fiber or film. Furthermore, a predetermined pattern is formed on the surface of the fiber or film, thus improving the outer appearance thereof, thereby increasing consumers' buying motivation.

The kind of resin for forming the resin pattern layer is not particularly limited in the present invention, and may include a moisture-permeable urethane-based resin such as a porous urethane resin, a moisture-impermeable urethane-based resin, a moisture-permeable polyester-based resin, a moisture-impermeable polyester-based resin, an acrylic resin, a silicone resin, etc. Particularly useful is a hydrophilic urethane-based resin, taking into consideration the moisture-permeable waterproof performance.

Regardless of whether the substrate fiber has a dark primary color or a bright primary color, the resin may clearly show the pattern. Even when the dye of the substrate fiber is transferred and sublimated to the resin, the resin is preferably white-colored or gray-colored so as not to damage the outer appearance thereof, but the present invention is not necessarily limited thereto. In order to control the color of the resin to white or gray, titanium oxide or carbon black may be used, and in order to improve a tactile sensation, inorganic particles such as silica or barium sulfate may be contained therein.

Also, the resin is preferably applied in the range of 10 to 80% of the area of the fabric, and may have a continuous pattern. If the area coverage ratio is smaller than 10%, it is difficult to maintain a continuous pattern. On the other hand, if the area coverage ratio is greater than 80%, the moisture permeability of the waterproof moisture-permeable fabric may decrease. The continuous pattern is not particularly limited, but when formed on the portion that comes into contact with the skin, the resin is not separated but is connected while forming a lattice pattern using a straight line or a curved line, thereby protecting the fiber from friction with the skin.

MODE FOR INVENTION

EXAMPLES

A better understanding of the present invention may be obtained through the following examples, which are set forth to illustrate, but are not to be construed as limiting the scope of the present invention.

Preparation Example 37 wt % of dimethyl terephthalate, 24 wt % of 1,4-butanediol and 39 wt % of polyethylene glycol having a number average molecular weight of 2,000, and 0.05 parts by weight of trimethanol propane as a crosslinking agent, based on 100 parts by weight, which is the total weight of the above compounds, were placed in an ester interchange reactor, added with 0.16 parts by weight of a titanium butoxide catalyst, heated to 180° C. from 120° C. for 120 min, and reacted at 180° C. for 60 min, and the amount of methanol as the reaction effluent was taken as the reaction rate. The reaction was terminated when the reaction rate was 90% or more, thus obtaining an oligomer.

The oligomer was transferred into a polycondensation reactor, added with 0.24 parts by weight of a phenolic antioxidant, and polycondensed while being heated to 245° C. for 120 min (the reaction pressure was reduced from 760 torr to 0.3 torr for 60 min and then maintained at a high vacuum of 0.3 torr or less for 60 min), and the reaction was terminated when the stirrer torque reached the level desired by the developer, and the prepared thermoplastic polyester elastomer was taken out of the reactor using nitrogen pressure, cooled and then formed into pellets.

The thermoplastic polyester elastomer pellets obtained through melt polymerization were placed in a rotatable reactor, the inner pressure of the reactor was reduced to 0.3 torr, and solid polymerization was carried out until the flow index reached a desired level while the reactor was heated and rotated at 180 to 190° C. for about 12 to 18 hr, thus preparing a thermoplastic elastomer resin (A) having a Shore D hardness of 46D and an intrinsic viscosity of 3.2.

Meanwhile, a thermoplastic elastomer resin (B) having a Shore D hardness of 40D and an intrinsic viscosity of 3.2 was prepared in the same manner as in the preparation of the elastomer A, with the exception that 35 wt % of dimethyl terephthalate, 22 wt % of 1,4-butanediol and 43 wt % of polytetramethylene glycol having a number average molecular weight of 1,000, and 0.05 parts by weight of trimethanol propane as a crosslinking agent based on 100 parts by weight, which is the total weight of the above compounds, were used.

Example 1. Formation of Moisture-Permeable Waterproof Film

Example 1-1

The thermoplastic elastomer resin (A) and the thermoplastic elastomer resin (B), obtained in the Preparation Example, were mixed to give a thermoplastic elastomer resin so that, based on 100 parts by weight of the thermoplastic elastomer resin, the amounts of PEG_SG (PEG of soft segment) and PTMG_SG (PTMG of soft segment) were 37 parts by weight and 2.3 parts by weight, respectively, as shown in Table 1 below. Also, based on 100 parts by weight of the thermoplastic elastomer resin, an anti-blocking agent and an anti-weathering agent (a heat-resistant aging inhibitor and a UV stabilizer) were mixed in the amounts (parts by weight) shown in Table 1 below, thus affording a thermoplastic elastomer resin composition for a moisture-permeable waterproof film, which was then extruded under conditions of 230 to 260° C., a feeding rate of 40 kg/hr and a screw speed of 250 rpm using a biaxial extruder having a diameter of 40 mm and an extrusion ratio of 40, followed by rapid cooling and solidification using a casting drum, thereby manufacturing a film having a thickness of 15 μm.

Examples 1-2 to 1-7

Respective moisture-permeable waterproof films of Examples 1-2 to 1-7 were manufactured in the same manner as in Example 1-1, with the exception that the thermoplastic elastomer resin (A) and the thermoplastic elastomer resin (B), obtained in the Preparation Example, were mixed to prepare a thermoplastic elastomer resin, like the amounts of PEG_SG (PEG of soft segment) and PTMG_SG (PTMG of soft segment) in the thermoplastic elastomer resin of Example 1-1, as shown in Table 1 below (here, the anti-weathering agent was not used in Example 1-7).

Comparative Example. Formation of Moisture-Permeable Waterproof Film

Respective moisture-permeable waterproof films of Comparative Examples 1-1 to 1-5 were manufactured in the same manner as in Example 1-1, with the exception that the thermoplastic elastomer resin (A) and the thermoplastic elastomer resin (B), obtained in the Preparation Example, were mixed to prepare a thermoplastic elastomer resin, like the amounts of PEG_SG (PEG of soft segment) and PTMG_SG (PTMG of soft segment) in the thermoplastic elastomer resin of Example 1-1, as shown in Table 1 below (here, the anti-blocking agent was not used in Comparative Example 1-5).

TABLE 1

| No. (Amount: parts by weight) | Moisture-permeable waterproof film | | | Anti-blocking agent (parts by weight) | Anti-weathering agent (parts by weight) |
|---|---|---|---|---|---|
| | PEG_SG (wt %) | PTMG_SG (wt %) | PBT_HG (wt %) | | |
| Ex.1-1 | 35.0 | 2.0 | 63.0 | 2 | 1 |
| Ex.1-2 | 30.0 | 1.0 | 69.0 | 2 | 1 |
| Ex.1-3 | 48.0 | 3.7 | 48.3 | 2 | 1 |
| Ex.1-4 | 48.0 | 1.0 | 51.0 | 2 | 1 |
| Ex.1-5 | 55.0 | 5.0 | 40.0 | 2 | 1 |
| Ex.1-6 | 63.0 | 8.0 | 29.0 | 2 | 1 |
| Ex.1-7 | 50.0 | 3.7 | 46.3 | 2 | — |

TABLE 1-continued

| No.<br>(Amount:<br>parts by<br>weight) | Moisture-permeable waterproof film | | | Anti-<br>blocking<br>agent<br>(parts by<br>weight) | Anti-<br>weathering<br>agent<br>(parts by<br>weight) |
|---|---|---|---|---|---|
| | PEG_SG<br>(wt %) | PTMG_SG<br>(wt %) | PBT_HG<br>(wt %) | | |
| C.Ex.1-1 | 12.0 | 0.5 | 87.5 | 2 | 1 |
| C.Ex.1-2 | 78.0 | 13.0 | 9.0 | 2 | 1 |
| C.Ex.1-3 | 48.0 | 0 | 52.0 | 2 | 1 |
| C.Ex.1-4 | 48.0 | 18.0 | 34.0 | 2 | 1 |
| C.Ex.1-5 | 48.0 | 3.7 | 48.3 | — | 1 |

Measurement of Properties (Measurement 1)
—Intrinsic Viscosity (IV)

0.4 g of a PET pellet (sample) was placed in 100 mL of a reagent comprising phenol and 1,1,2,2-tetrachloroethanol mixed at a weight ratio of 6:4, dissolved for 90 min, transferred into a Ubbelohde viscometer and maintained in a thermostatic bath at 30° C. for 10 min, after which the time, in seconds, taken for the solution to fall was measured using a viscometer and an aspirator. The falling time, in seconds, of the solvent was measured in the same manner as above, and R.V. and I.V. values were calculated using the following Mathematical Equations 1 and 2. In the Mathematical Equations, C indicates the concentration of the sample.

$$R.V. = \text{falling time (seconds) of sample/falling time (seconds) of solvent} \quad \text{[Mathematical Equation 1]}$$

$$I.V. = \tfrac{1}{4}(R.V.-1)/C + \tfrac{3}{4}(\ln R.V./C) \quad \text{[Mathematical Equation 2]}$$

—Shore D Hardness

Shore D hardness was measured in accordance with ASTM D2240. To this end, a Toyoseiki Digital Hardness Tester was used.

—Measurement of Moisture Permeability (Water Method, ASTM E 96 BW):

42 mL of water at about 40° C. was placed in a moisture-permeable cup warmed to about 40° C., and a test sample was set so that the lower surface thereof was spaced apart from water at a distance of 10 mm. Then, the back surface of the test sample was disposed to face the water, the test sample was cut so as to be concentric with the cup, and a packing and a ring were sequentially mounted thereto and fixed with nuts, after which the mounted circumference was sealed with a piece of vinyl adhesive tape, thus preparing a test specimen. This test specimen was placed at a position spaced apart from the upper surface of the test sample by about 1 cm in a temperature- and humidity-controlled device at a constant temperature of 30° C.×2° C. and a constant humidity of (50×5° C.)% RH(3). After exactly 1 hr, the mass (a1) of the test specimen was measured to the nearest mg. Thereafter, the test specimen was placed again in the same position in the temperature- and humidity-controlled device. After exactly 1 hr, the test specimen was taken out of the device and the mass (a2) thereof was measured to the nearest mg. The moisture permeability was calculated (converted based on 24 hr) using the following Equation 1, and three test results were averaged and represented as the integer.

$$\text{Moisture permeability } (g/m^2 \cdot h) = \{40 \times (a2-a1)\}/\text{moisture-permeating area (cm}^2) \quad \text{Equation 1}$$

—Measurement of Moisture Permeability (Potassium Acetate Method, JIS L1099):

300 g of potassium acetate in accordance with JIS K 8363 was added to 100 mL of water and allowed to stand overnight, after which humectants in which crystals were precipitated were placed in a moisture-permeable cup having a standard size, a moisture-permeable waterproof film or fabric was mounted thereto, and an assistant film having a size of about 10×10 cm for measurement of moisture permeability was mounted with a rubber band, thereby preparing a test specimen. The mass (a3) of the test specimen was measured to the nearest mg under the condition that the mounted film was positioned upward. After the measurement, the test specimen was inverted and mounted in a support frame in a water bath. After 15 min, the test specimen was taken out and inverted, and the mass (a4) thereof was measured to the nearest mg. The moisture permeability was calculated (converted based on 24 hr) using the following Equation 2, and three test results were averaged.

$$\text{Moisture permeability } (g/m^2 \cdot h) = \{40 \times (a4-a3)\}/\text{moisture-permeable area (cm}^2) \quad \text{Equation 2}$$

—Measurement of Hydrostatic Pressure (KSK ISO 811-2009):

A water transmission test was performed using a Hydrostatic Tester (FX-3300). The water pressure of 60 cmH$_2$O/min using water at 20° C. was applied to the moisture-permeable waterproof film or fabric, and the pressure was measured when water began to appear at three portions on the surface of the moisture-permeable waterproof film or fabric opposite the surface on which the water pressure was applied. When the hydrostatic pressure is measured using the film alone, the film may bloom due to the applied water pressure by virtue of the elasticity of the film itself, making it difficult to accurately measure the hydrostatic pressure. Hence, the film was positioned so as to bring the surface thereof into contact with water, and two mesh fabric sheets (PET 20 Denier/1 Filament woven fabric in plain weave with yarn, with an open space of 75% or more) were placed on the upper surface of the film, after which the pressure was measured with a hydraulic head.

—Measurement of Weatherability:

Using a QUV Accelerated weathering tester, the film was irradiated with a UV lamp for 24 hr at 340 nm and 0.75 w/m$^2$*hr, and the outer appearance of the film was observed with the naked eye and evaluated based on the following criteria.

⊚: Good=>no changes in outer appearance

○: Fair=>some cracks occurred but the overall shape remains

X: Poor=>crumbled due to lots of cracks and changed appearance.

—Measurement of Haze and Light Transmittance:

Transmittance was measured using NDH 5000 (Tt: total transmittance, Td: diffusion transmittance, Tp: parallel transmittance), and haze was calculated in accordance with ASTM D1003 using Equation 3 below.

$$\text{Haze (\%)} = \{(Td=Tt-Tp)/Tt\} \times 100 \quad \text{Equation 3}$$

—Measurement of Contact Angle:

A water droplet was dropped onto the surface of the film using a DSA100 contact angle meter from KRUSS, and a static contact angle was measured at the contact point between the end point of the water droplet and the surface of the solid at the junction of the water droplet. The lower the contact angle, the higher the wettability (hydrophilicity).

—Measurement of Film-Forming Processability:

The processing characteristics, such as melt flowability, workability and stickiness upon formation of a film were observed with the naked eye and evaluated based on the following criteria.

⊚: Good—high melt flowability and workability and no stickiness upon forming a film Δ: Fair—process conditions such as melt flowability, workability and stickiness have to be controlled upon forming a film and problems with the outer appearance of the film (wrinkles, lines, etc.) occurred X: Poor—necking occurs due to poor melt flowability upon forming a film, or production of a film product is difficult due to poor workability and stickiness —Measurement of Swelling:

When water was dropped onto the surface of the film, the degree of swelling was observed with the naked eye. The cases where changes in the outer appearance thereof are severe are indicated with an "X" and the cases where changes in the outer appearance thereof are not severe are indicated with an "O".

TABLE 2

|  | Moisture permeability (Water method) ($g/m^2 *$ day) | Moisture permeability (Acetic acid method) ($g/m^2 *$ day) | Film-forming process-ability | Hydrostatic pressure ($mmH_2O$) | Weather-ability | Haze (%) | Contact angle (θ) | Swelling |
|---|---|---|---|---|---|---|---|---|
| Ex.1-1 | 13000 | 56000 | ⊚ | 20000 | ⊚ | 70 | 78 | ○ |
| Ex.1-2 | 12000 | 53000 | ⊚ | 20000 | ⊚ | 70 | 79 | ○ |
| Ex.1-3 | 15300 | 68000 | ⊚ | 19500 | ⊚ | 70 | 75 | ○ |
| Ex.1-4 | 17200 | 85000 | ⊚ | 20000 | ⊚ | 70 | 72 | ○ |
| Ex.1-5 | 17800 | 90000 | ⊚ | 15000 | ⊚ | 70 | 68 | ○ |
| Ex.1-6 | 18600 | 98000 | ⊚ | 14000 | ⊚ | 70 | 57 | ○ |
| Ex.1-7 | 15000 | 61000 | ⊚ | 19400 | ○ | 70 | 77 | ○ |
| C.Ex.1-1 | 3000 | 7300 | ⊚ | 20000 | ⊚ | 70 | 105 | ○ |
| C.Ex.1-2 | 21000 | 105000 | Δ | 1300 | X | 70 | 33 | X |
| C.Ex.1-3 | 18000 | 89000 | Δ | 20000 | ○ | 70 | 65 | X |
| C.Ex.1-4 | 6500 | 8700 | ⊚ | 16000 | ⊚ | 70 | 87 | ○ |
| C.Ex.1-5 | — | — | X | — | — | — | — | — |

As is apparent from the results of Table 2, Comparative Example 1-1, in which the amount of PEG was low, deteriorated hydrophilicity and moisture permeability, making it impossible to function as a moisture-permeable waterproof film. In Comparative Examples 1-2 and 1-3, in which the amount of PEG was very high or PTMG was not contained, moisture permeability was good but surface hydrophilicity was excessively increased, making it difficult to laminate fabrics and manufacture clothes due to swelling, and furthermore, hydrostatic pressure was decreased. In Comparative Example 1-4, the amount of PTMG was increased, and thus hydrophobicity was increased to thus reduce moisture permeability, and in Comparative Example 1-5, in which the anti-blocking agent was not used, workability was decreased during the film formation process, making it difficult to form a film.

Example 2. Production of Moisture-Permeable Waterproof Fabric

Example 2-1

For a substrate fiber, polyethylene terephthalate multifilament twisted DTY 70 DEN/48fil (Kolon Fashion Material, Inc.) was used as warp and weft to thus form a raw plain-woven fabric, which was then subjected to a dyeing process including water-repellent processing (using a fluorine-based water-repellent agent), thus obtaining a polyester fabric (weight 110 $g/m^2$) dyed with black using a dispersion dye (Kyung-In Synthetic Corp., KISCO Black S-SG). Thereafter, the moisture-permeable waterproof film of Example 1-1 was stacked on the entirety of one surface of the polyester fabric using a urethane-based adhesive (amount of adhesive for attachment: 12 $g/m^2$), thus manufacturing a moisture-permeable waterproof fabric of Example 2-1.

Examples 2-2 to 2-7

Respective moisture-permeable waterproof fabrics of Examples 2-2 to 2-7 were manufactured in the same manner as in Example 2-1, with the exception that the respective films of Examples 1-2 to 1-7 were stacked on the substrate fiber of Example 2-1.

Comparative Example 2. Production of Moisture-Permeable Waterproof Fabric

Comparative Examples 2-1 to 2-4

Respective moisture-permeable waterproof fabrics of Comparative Examples 2-1 to 2-4 were manufactured in the same manner as in Example 2-1, with the exception that the respective films of Comparative Examples 1-1 to 1-4 were stacked on the substrate fiber of Example 2-1.

Measurement 2

Moisture permeability, hydrostatic pressure, and weatherability were measured in the same manner as in the above Measurement 1, and the following test was further performed, and thus the properties of the moisture-permeable waterproof fabrics were tested. The results are shown in Table 3 below.

—Measurement of Water-Resistant Adhesive Strength:

Water washing was performed 20 times in accordance with JIS L1089-1970. Changes in the outer appearance of the fabric after washing were evaluated as good (no stripping), fair (partial stripping), and poor (stripping of at least half of the adhesion area), and the water-resistant adhesive strength after washing (water-washing resistance) was evaluated based on the above adhesive strength measurement method.

TABLE 3

| | Moisture permeability (Water method) (g/m² * day) | Moisture permeability (Acetic acid method) (g/m² * day) | Hydrostatic pressure (mmH₂O) | Water-resistant adhesive strength | Weather-ability |
|---|---|---|---|---|---|
| Ex.2-1 | 8500 | 28500 | 20000 | Good | ◎ |
| Ex.2-2 | 8300 | 26700 | 20000 | Good | ◎ |
| Ex.2-3 | 10000 | 31000 | 20000 | Good | ◎ |
| Ex.2-4 | 12500 | 39000 | 20000 | Good | ◎ |
| Ex.2-5 | 13500 | 43200 | 18000 | Fair | ◎ |
| Ex.2-6 | 14000 | 44500 | 15000 | Fair | ◎ |
| Ex.2-7 | 9000 | 18000 | 20000 | Good | O |
| C.Ex.2-1 | 1830 | 3300 | 20000 | Good | ◎ |
| C.Ex.2-2 | 16300 | 48000 | 3600 | Poor | X |
| C.Ex.2-3 | 13700 | 44000 | 20000 | Poor | O |
| C.Ex.2-4 | 4700 | 5800 | 17000 | Poor | ◎ |

As is apparent from the results of Table 3, all of Examples 2-1 to 2-5 exhibited superior moisture permeability and hydrostatic pressure and fair or good water-resistant adhesive strength and weatherability.

In contrast, Comparative Example 2-1, having low PEG content, exhibited poor hydrophilicity and thus the moisture permeability of the fabric deteriorated, making it impossible to manifest sufficient functionality. On the other hand, Comparative Example 2-2, using high PEG content, exhibited improved moisture permeability but deteriorated hydrostatic pressure, water-resistant adhesive strength and weatherability due to high surface hydrophilicity. Also, Comparative Example 2-3, containing no hydrophobic polyol, underwent a swelling phenomenon and severe changes in the outer appearance thereof, resulting in poor water-resistant adhesive strength. Also, Comparative Example 2-4 exhibited deteriorated moisture permeability due to the high hydrophobicity thereof, making it impossible to realize an efficient function as the moisture-permeable waterproof fabric.

The invention claimed is:

1. A moisture-permeable waterproof film, which has a moisture permeability of 10,000 to 150,000 (g/m2*day) in accordance with JIS L 1099(B-I) and a hydrostatic pressure of 5,000 to 30,000 (mm H2O) in accordance with KSK ISO 811-2009, formed using a thermoplastic elastomer resin composition comprising a thermoplastic elastomer resin and 0.01 to 30 parts by weight of an anti-blocking agent based on 100 parts by weight of the thermoplastic elastomer resin,
   wherein the thermoplastic elastomer resin comprises a soft segment containing 30 to 70 wt % of a polyethylene glycol component and 0.1 to 10 wt % of a polytetramethylene glycol component and a hard segment containing the remainder of a polybutylene terephthalate component based on a total weight of the thermoplastic elastomer resin, and
   wherein the polyethylene glycol component has a number average molecular weight of 600 to 8,000, and the polytetramethylene glycol component has a number average molecular weight of 600 to 8,000.

2. The moisture-permeable waterproof film of claim 1, wherein the thermoplastic elastomer resin includes a thermoplastic elastomer resin (A), obtained by copolymerizing a polybutylene terephthalate (PBT) component and a polyethylene glycol component, and a thermoplastic elastomer resin (B), obtained by copolymerizing a polybutylene terephthalate (PBT) component and a polytetramethylene glycol component.

3. The moisture-permeable waterproof film of claim 1, wherein the anti-blocking agent is at least one selected from the group consisting of silicon, silica, calcium carbonate, talc, montmorillonite, mica, wollastonite, barium sulfate, titanium dioxide, zeolite, and Teflon.

4. The moisture-permeable waterproof film of claim 1, wherein the thermoplastic elastomer resin composition further comprises 0.5 to 15 parts by weight of an additive based on 100 parts by weight of the thermoplastic elastomer resin.

5. The moisture-permeable waterproof film of claim 4, wherein the additive is at least one selected from the group consisting of a heat-resistant agent and an anti-weathering agent including a hindered amine-based light stabilizer and a UV absorbent.

6. The moisture-permeable waterproof film of claim 1, wherein the moisture-permeable waterproof film has a haze of 30 to 90% in accordance with ASTM D1003.

7. The moisture-permeable waterproof film of claim 1, wherein the film has a thickness of 1.0 to 100 μm.

* * * * *